United States Patent [19]

Jinghage et al.

[11] Patent Number: 4,580,344

[45] Date of Patent: Apr. 8, 1986

[54] COLLAPSIBLE SAW

[76] Inventors: Sven O. Jinghage, Käringbergsvägen 23, Leksand, Sweden, S-793 00; Per H. Stenlund, Box 174, Lycksele, Sweden, S-921 00

[21] Appl. No.: 747,397

[22] Filed: Jun. 21, 1985

Related U.S. Application Data

[63] Continuation of Ser. No. 610,658, May 16, 1984, abandoned.

[51] Int. Cl.⁴ .............................................. B27B 21/00
[52] U.S. Cl. .......................................... 30/512; 30/507
[58] Field of Search ................. 145/33 B, 33 E, 33 R, 145/62, 61 L

[56] References Cited

U.S. PATENT DOCUMENTS

| | | | |
|---|---|---|---|
| 1,218,429 | 3/1917 | McCann et al. | 145/33 R |
| 1,500,406 | 7/1924 | McIntire | 145/33 |
| 2,595,288 | 5/1952 | Peters | 145/33 E |
| 2,613,709 | 10/1952 | Terrill | 145/33 E |
| 3,245,445 | 4/1966 | Herman et al. | 145/62 |
| 3,724,519 | 4/1973 | McCord | 145/33 E |
| 4,196,761 | 4/1980 | Royer | 145/61 L |
| 4,361,177 | 11/1982 | Miller | 145/33 E |

FOREIGN PATENT DOCUMENTS

| | | | |
|---|---|---|---|
| 357908 | 11/1905 | France | 145/33 E |
| 1095758 | 12/1954 | France | 145/33 R |

Primary Examiner—Frederick R. Schmidt
Assistant Examiner—J. T. Zatarga
Attorney, Agent, or Firm—Holman & Stern

[57] ABSTRACT

A collapsible saw comprising an elongated hollow frame member, a handle pivotally connected to the frame member by an interconnecting member to form an angle with a saw blade connected between the free end portions of the angle, and a lever pivotally attached to the free end portion of the handle including a device for engagement with the saw blade and arranged to hold the saw blade by means of toggle action. When the saw is in the position for use, the handle and the interconnecting member abut the frame member at a distance from the point of attachment for the interconnecting member. The saw thus combines a rigid structure with rapid engagement of the saw blade.

4 Claims, 6 Drawing Figures

COLLAPSIBLE SAW

This is a continuation of application Ser. No. 610,658, filed May 16, 1984, now abandoned.

BACKGROUND OF THE INVENTION

1. Field of the Invention

This invention pertains to saws of the type which can be quickly and easily collapsed into a compact article.

2. Description of the Prior Art

There are basically three categories of known collapsible saws, a first category being so-called knockdown saws, having frame members and a saw blade arranged detachable in relation to each other. A second category is the type having three-membered frames including a back member and two legs members, the saw blade being held between the free ends of the leg members. A third category of saws includes a straight frame member with a handle pivotally connected to one end of the frame member, arranged to form an angle with a saw blade interconnecting the free end portions of the frame member and the handle, and this is the type of saw contimplated herein.

Examples of this third category of saws are disclosed in U.S. Pat. Nos. 3,245,445 and 3,724,519. The collapsible saw of U.S. Pat. No. 3,245,445 has many advantages, but it is provided with a threaded blade tightening element carrying a wing nut. With this type of tensioning element, there is always an obvious risk of getting the blade so tight that the frame members are bent or subjected to undue stresses, and this risk is emphasized if the user decides to tighten the blade with pliers. Overtightening is far more serious in the case of lighter weight collapsible saws than in the case of solid-membered conventional saws having wingnut blade tightening bolts. A further disadvantage is the offset extension necessary for carrying the tightening element, as well as the short leg portion extending transversely from the end of the handle remote to the offset extension, since these two members extend outwardly from the straight member when the saw is folded together into a non-operative position. When used with multiple saw blades, the blades not selected must be entered into the straight member one at the time. There is obviously also a certain risk that the user quite easily may lose the wingnut, thus making the saw inoperable.

The collapsible saw disclosed in U.S. Pat. No. 3,724,519 includes expanding lever means positioned across the angle formed by the frame member and the handle to overcome the disadvantages of a threaded blade and the handle as replacement for a tightening element carrying a wing nut. The handle, pivotally connected to one end portion of the frame member, is movable between a position extending transversely from the frame member and a position in contact with the adjacent side of the frame member, i.e. a sector in which no movement should occur when the saw is used. As a consequence, the lever means extending across the angle formed by the frame and the handle, is acting as the only element maintaining the angular relationship between the frame member and the handle when the saw is used. The obvious disadvantage of this type of arrangement is the fact, that the handle is only restricted by the expanding lever means from a folding movement directed towards the frame member, and as a result, the saw frame is in no way as rigid as the saw frame discussed with reference to U.S. Pat. No. 3,245,445, in which such a movement can not be performed. Apart from the risk that the saw may collapse during use, or perform unsatisfactorily due to varying tension imposed on the saw blade if the lever means is not maintained rigid, the saw frame is only intended to carry one saw blade within a magazine defined by the frame, and it is obviously desirable to have more than one type of saw blade readily available.

BRIEF SUMMARY OF THE INVENTION

Collapsible saws which utilize threaded blade tension elements carrying threaded wing nuts can not be protected against over-tightening, and include structural members extending from the handle, when collapsed, which are undesirable and increase the width of the collapsed saw. The rigidity of saws permitting inward movement is based entirely on the expanding lever means positioned across the angle formed by the frame and the handle, and even small changes in the length of extension for the lever means, caused by forces imposed during operation, causes a varying tension for the saw blade, and there is also an obvious risk that the entire saw frame may collapse.

In the saw of this invention an elongated, hollow, open-sided frame defining a magazine housing has one of its ends pivotally connected to a handle adapted to partially nestle against the frame, as in the case of U.S. Pat. No. 3,245,445. However, in the collapsible saw herein the threaded means is eliminated, the free end portion of the handle being pivotally connected to a lever, which can be moved from a position substantially corresponding to the handle to a position extending outwardly from same, said lever being arranged with means facilitating attachment of a free end of the saw blade in a region located adjacent to the pivoting attachment point for the lever. The pivoting connection between the handle and the frame is also further improved, and as a result, the handle and the frame can be located in an adjacent position to each other, without any structural elements increasing the width of the collapsed saw. A number of saw blades are advantageously disposed within the magazine, all of which are easily swung out for selection or moved back into the magazine. The invention also contemplates the use of the frame as a measuring stick, thereby further increasing the field of use for the saw, and it is also disclosed how the handle can be used to support and carry a small knife, i.e. a useful tool in connection with many tasks performed with a collapsible saw.

The present invention is based on the use of a frame member closely resembling the frame of U.S. Pat. No. 3,245,445, i.e. comprising an elongated, hollow, open-sided frame defining a magazine, at least one saw blade pivotally connected at one end thereof to one end of said frame and pivotable to and from a storage position within the magazine. The handle is pivotally connected to the other end of the frame, but by means of a member extending from the handle, whereby no structural member extends transversely outwardly from the handle when the saw is collapsed. The lever, pivotally connected to the free end portion of the handle is a novel constructional element, facilitating rapid and correct attachment of a saw blade when the handle has been swung out to a position extending substantially transversely in relation to the frame. In the collapsible saw of this invention there are a number of significant changes in the mode of construction which overcome disadvantages relating to previously known collapsible saws.

BRIEF DESCRIPTION OF THE DRAWINGS

The invention will be more readily understood by the following detailed description of the saw of the invention with reference to the accompanying drawings, wherein.

DETAILED DESCRIPTION

Figure 1:
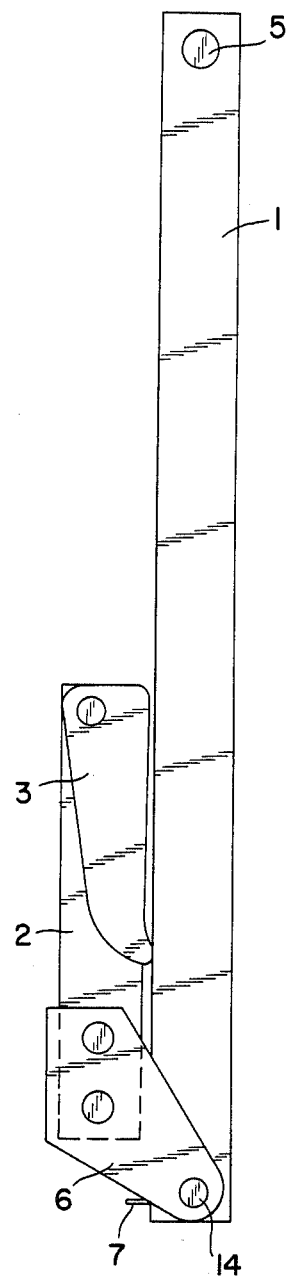
FIG. 1 is a side elevational view of a saw according to the present invention in the collapsed position.
Figure 2:
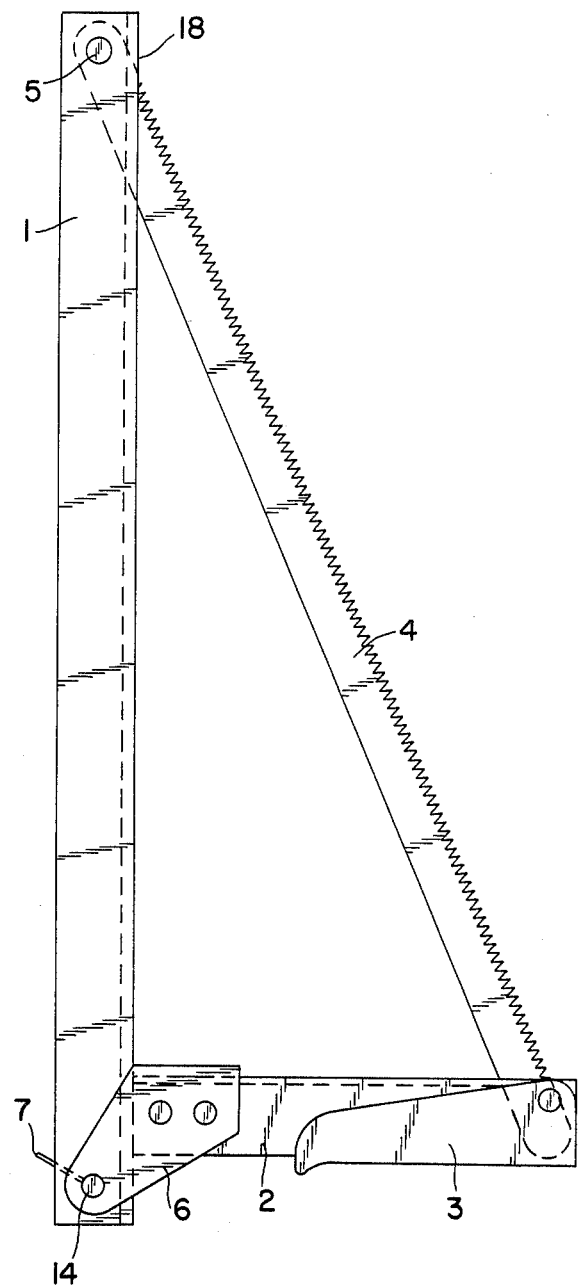
FIG. 2 is a side elevational view of the saw in the extended or operable position.

Referring now to the drawings, the saw is shown in its collapsed position in FIG. 1. and in its position for use in FIG. 2. The saw includes a barlike frame member 1 of channel stock, a handle 2, a lever 3 pivotally connected to the free end of the handle 2, and a saw blade 4. The saw blade 4 may advantageously include a number of saw blades pivotally suspended at one end portion by means of a screw 5, or similar member, extending between the side walls of the frame member 1 adjacent to the free end portion of same. The frame member 1 is an elongated, hollow, open-sided frame defining a magazine housing, the housing being formed by two sides and an interconnecting bight portion. The handle 2 is advantageously formed from a similar but shorter piece of channel stock. As shown in FIG. 1, the frame member 1 and the handle 2 extend in an adjacent and substantially parallel relationship to each other when the saw is in a collapsed position, the lever 3, being of substantially U-shaped cross-section, arranged in an intermediate position and located embracing the handle 2.

The frame member 1 and the handle 2 are joined together by means of an interconnecting member 6, rigidly attached to the handle 2 and at a free end portion being pivotally attached at 14 to the frame member 1. This interconnecting member 6 has a substantially U-shaped cross-section, and extends in an inclined relationship to the longitudinal axis of the handle 2, whereby the pivoting axis is located in a plane spaced from the plane of the handle 2.

When the saw is to be extended into operable position, the handle 2 is swung around the end of frame member 1 to the position shown in FIG. 2, i.e. until the upper portion of the handle 2 and the interconnecting member 6 abut the opposed and closed surface of the frame member 1. As a following step, the lever 3 is swung out from the end of handle 2 into a position extending substantially in the same direction as the handle 2, and the saw blade 4, or the saw blades 4, are swung out of the frame member 1 by holding the saw with the open part of the frame member 1 directed downwardly. If more than one saw blade 4 is enclosed within the frame member 1, a small U-shaped spring 7 is advantageously arranged located at the end portion of the frame member 1 adjacent to the interconnecting member 6, having the legs pivotally attached within the frame member 1, and being manually movable between a first position in which it restricts a movement outwardly of the saw blades 4 enclosed within the frame member 1, and a second position in which the saw blades 4 can be swung out of the frame member 1.

Figure 3:
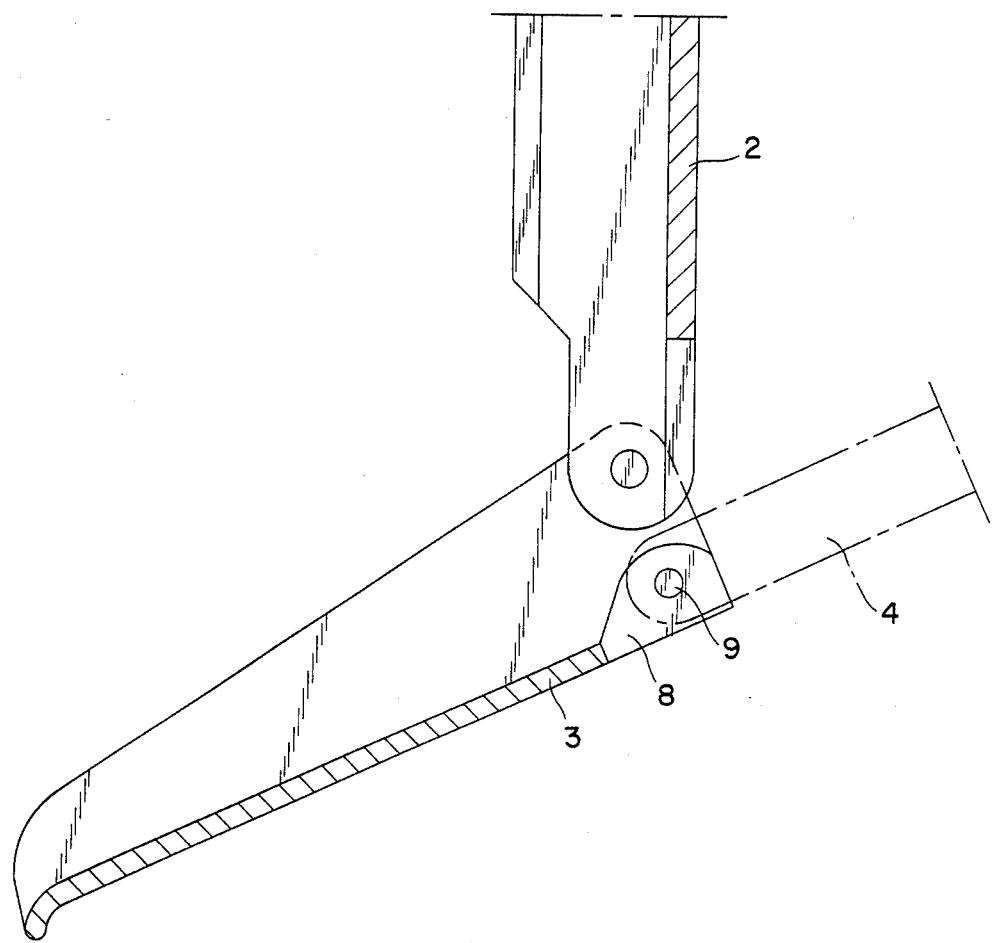
FIG. 3 is a cross-sectional view of the handle of the saw of the invention in a position facilitating engagement and disengagement of the free end portion of a saw blade.
Figure 4:
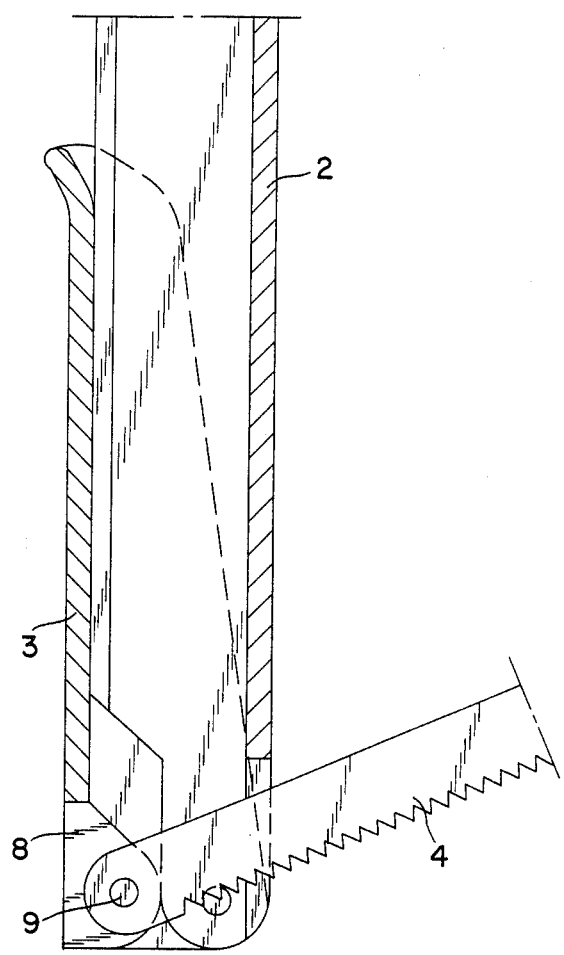
FIG. 4 is a cross-sectional view of the handle in a position when the saw is ready for use.

When desired saw blade 4 has been selected, remaining saw blades 4, if any, are swung back into the frame member 1, and the spring member 7 is moved back into the restricting first position, thereby securing the unused saw blades 4 in a safe position within the frame member 1. The saw blade is swung around its pivot 5 into a slot 18 in the free end of frame member 1. The free end of the selected saw blade 4, being arranged in a conventional manner with a through hole, is then moved into a slot 8 provided in the lever 3 and the hole is engaged onto a stud 9 mounted in the end of and partly spanning the interior of the lever 3 (FIG. 3), whereafter the lever 3 is moved back into the original position, i.e. embracing the handle 2 (FIG. 4). The saw is now ready for use, and the handle 2 in combination with the lever 3 form a most suitable means for holding the saw, since the lever 3 closes the open portion of the handle 2 and has a design facilitating a suitable grip.

When the lever 3 is moved back into position discussed above, the stud 9 swings around the adjacent pivot to a position further away from the fixed attachment point 5 for the saw blades 4 located at the free end portion of the frame member 1, and as a result, a predetermined tension is imposed on the saw blade 4. It is thus impossible to impose such a tension in the saw blade 4, that any damage can occur to the structure of the saw frame.

Figure 5:
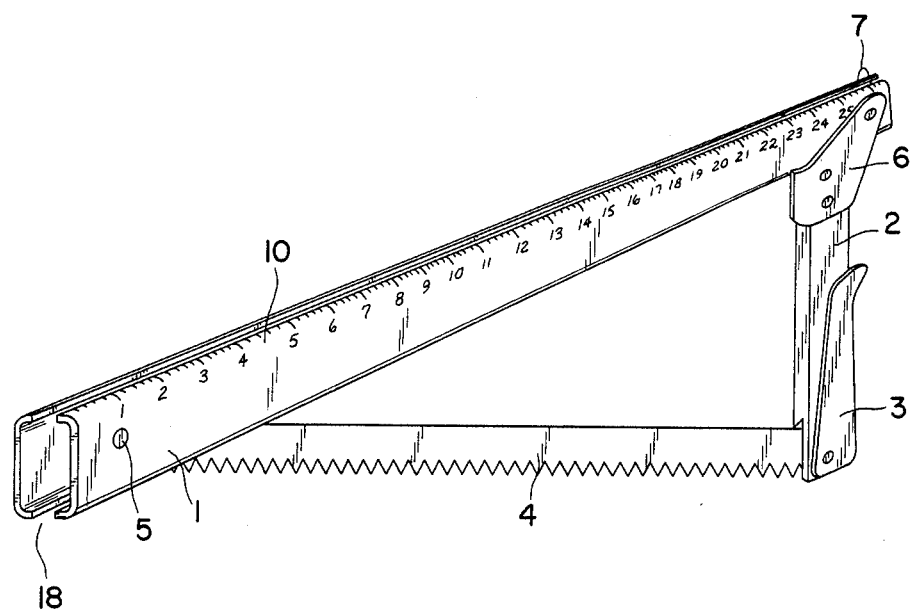
FIG. 5 is a perspective view of the saw of the invention showing the elongated frame arranged with means facilitating use as a measuring stick.

As shwon in FIG. 5, the collapsible saw according to the present invention may be further modified to increase its versatility by including a graded scale 10 located adjacent to at least one of the longitudinally extending edge portions of the frame member 1 which can be used as a measuring tool, i.e. a function which is often desirable when using a saw. The opposed side surfaces of the frame member 1 can be arranged with graded scales 10, one side surface being graded in metric and the other in English units.

Figure 6:
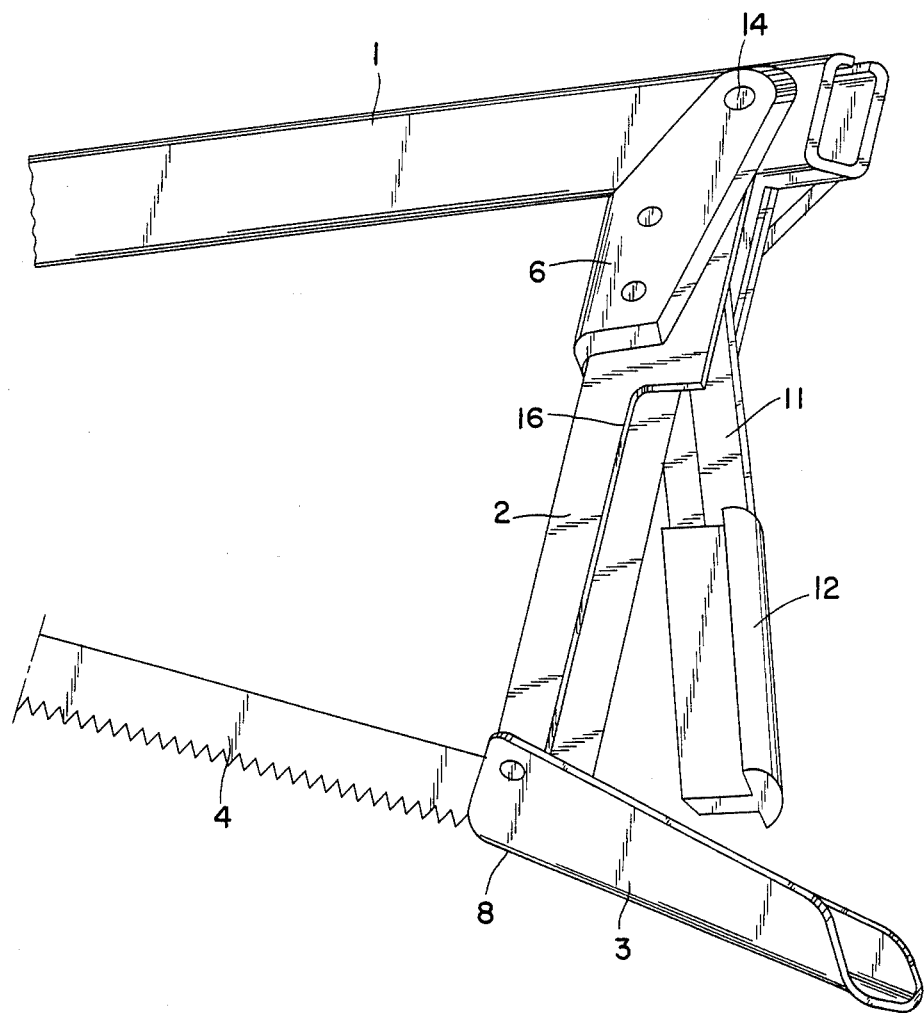
FIG. 6 is a perspective view of the handle, showing how it can be used as a supporting housing for a small knife.

FIG. 6 shows a further possible modification intended to add a further feature. A small knife comprising a blade 11 and a handle 12 is shown, intended to form a detachable part of the saw. The handle 12 has a cross-section facilitating insertion into the lower part of the handle 2 of the saw, which has a recess 16 in each of the sides, thus accomodating the handle 12 of the knife. When the lever 3 is located in the position embracing the handle 2 of the saw, i.e. the normal position, the knife is held securely with the blade protected by the handle 2 of the saw.

The modifications described with reference to FIGS. 5 and 6 are intended to increase the field of use for the collapsible saw, and may be used as independent or combined additional features.

Main advantages of the collapsible saw according to the present invention are the combination of low weight with an easily erectable and rigid structure, the toggle action of the lever 3, which combines secure and rapid installation or removal of a saw blade 4 with security against overtightening, and the means 7 which secures unused saw blades 4 within the frame member 1. When collapsed, the saw occupies a minimum of space, without any outwardly extending parts, and when in operable position, the interconnecting member 6 locates the end portion of the handle 2 at a distance from the end portion of the frame member 1 with both the interconnecting member 6 and the handle 2 abutting the closed side surface of the frame member, thereby forming an extremely rigid structure with the frame member 1 and the handle 2 extending in a substantially perpendicular relationship to each other.

We claim:

1. A saw comprising:
   an elongated, hollow, open sided frame member having a channel shaped cross-section defining a magazine within the channel for storing saw blades;
   at least one elongated saw blade pivotally connected adjacent one end thereof to said frame member adjacent one end thereof so that said at least one saw blade may be stored when not in use in said magazine within said frame member;
   a substantially U-shaped interconnecting member pivotally connected near the free ends of the legs of the U to the other end of said frame member with the frame member between the legs of the U to be rotatable around said other end between a folded position and a position for use of the saw on opposite sides of said frame member, the base portion of the U connecting the legs together having an edge abutting the frame member in the position for use;
   a hollow, open-sided handle attached to said interconnecting member in spaced relationship to the pivotal connection thereof to be rotatable therewith between opposite sides of said frame member so that in the folded position said handle extends substantially parallel and adjacent to said frame member with said open sides facing each other and in the use position projects substantially perpendicular to said frame member and is located closer to said one end of said frame member than the pivotal connection between said interconnecting member and said other end of said frame member;
   a toggle-acting elongated lever having a substantially U-shaped channel cross-sectional configuration pivotally connected near one end thereof to a free end portion of said handle at a point spaced from the attachment of said handle to said interconnecting member to be pivotable from a position substantially aligned with, corresponding to and at least partly embracing said handle to close off at least part of the open side of said handle to thereby form a hand grip to a position projecting at an angle thereto from said free end portion thereof;
   a projection on the inner surface of one of the legs of said U-shaped channel lever adjacent the pivotal connection thereof partly spanning the width of the channel insertable into a through hole in the saw blade for releasable engagement with said saw blade, said projection being positioned so that when engaged with said saw blade and said lever is moved into the position for use the projection is farther from said one end of said frame member than said pivotal connection between said lever and said handle to improse a predetermined tension in said saw blade;
   a slot in said one end of said frame member extending substantially parallel to and on the side of said frame member opposite the open-side having a length sufficient only to allow a saw blade to extend therethrough when in the position for use;
   a slot in said handle through which the end portion of the saw blade having a hole extends to engage said projection;
   a detachable knife comprised of a blade and a handle attached to the blade, said handle and blade having a cross-sectional shape to facilitate insertion into said saw handle through the open side thereof; and
   a cut-out portion on each outer side of said saw handle to form a recess adapted to accommodate said knife handle, so that when said lever is in the position at least partially embracing said saw handle, said knife is held with the blade protected by the saw handle.

2. A saw as claimed in claim 1 wherein a plurality of said saw blades are provided and further comprising a manually movable retaining member mounted on and adjacent to said other end of the frame member connected to the interconnecting member so that it is movable between a saw blade retaining position, in which it retains the saw blades in the magazine within the frame member, and a release position, in which the saw blades can be swung out of the magazine.

3. A saw as claimed in claim 1 wherein one side surface of the frame member is provided with a graded scale, facilitating the use of the frame member as a measuring stick or measuring rod.

4. A saw as claimed in claim 1 wherein both side surfaces of the frame are provided with differently graded scales facilitating the use of the frame member as a measuring stick or measuring rod.

* * * * *